Jan. 20, 1970          H. PAITCHELL          3,490,258
METHODS AND APPARATUS FOR SHAPING WORKPIECES
Filed June 3, 1966          5 Sheets-Sheet 1

FIG. 1A

INVENTOR.
HAROLD PAITCHELL

BY
*Lachenbach & Siegel*
ATTORNEYS

United States Patent Office 3,490,258
Patented Jan. 20, 1970

3,490,258
METHODS AND APPARATUS FOR SHAPING WORKPIECES
Harold Paitchell, Clifton, N.J., assignor to Emerson Electric Company, St. Louis, Mo., a corporation of Missouri
Filed June 3, 1966, Ser. No. 555,115
Int. Cl. B21d 22/18
U.S. Cl. 72—81                                37 Claims

ABSTRACT OF THE DISCLOSURE

Tracer controlled automatic metal spinning machine having a plurality of piston-cylinder motors for moving a spinning tool in a plurality of directions wherein the motors are mounted in general axial alignment one behind the other, together with motion transmitting linkages for moving the tool in response to the movement of the motors in such plurality of directions; whereby the reaction forces developed are transmitted substantially parallel the spinning axis.

---

This invention relates to methods and apparatus for shaping workpieces and more particularly, to methods and apparatus for shaping work pieces to a surface of revolution.

Although this invention is of general applicability to methods and apparatus for shaping work pieces of diverse material to surfaces of revolution with diverse types of tooling, the invention is hereinafter described, disclosed, illustrated and shown as applied to an automatic metal spinning machine. Such application herein is by way of example only, and the invention is not to be deemed limited thereby.

It is an object of this invention to provide apparatus for shaping work pieces to a surface of revolution.

It is another object of this invention, in addition to the foregoing object, to provide apparatus for shaping work pieces to a surface of revolution as by spinning wherein a work piece blank is mounted to a rotating chuck having a contour defining a surface of revolution and the blank is forced to conform to the contour of the chuck by tool means movable along a path defining the surface of revolution.

It is a further object of this invention, in addition to the foregoing objects, to provide apparatus for shaping work pieces to a surface of revolution which requires a minimum of floor space.

Yet another object of this invention, in addition to the foregoing objects, is to provide apparatus for shaping work pieces to a surface of revolution which is automatic in its operation and capable of doing the work of a highly skilled operator.

Another and yet still further object of this invention, in addition to the foregoing objects, is to provide a fully automatic metal spinning machine which is capable of accurately working very light gauges of metal at a high output rate to produce work pieces configured to a surface of revolution.

It is also an object of this invention, in addition to the foregoing objects, to provide novel apparatus for translating tool means in a plurality of directions.

Also among the objects of this invention, in addition to the foregoing objects, is the provision of methods of shaping work pieces to a surface of revolution.

The invention resides in the combination, construction, arrangement and disposition of the various component parts or elements incorporated in an improved apparatus for shaping work pieces to a surface of revolution and in improved methods of operating such apparatus. The present invention will best be understood, and objects and important features other than those specifically enumerated above, will become apparent when consideration is given to the following detailed description, which, when taken in conjunction with the annexed drawing, describes, discloses, illustrates and shows a preferred embodiment of the present invention and what is presently considered to be the best mode of practicing the principles thereof. Other embodiments or modifications may be suggested to those having the benefit of the teachings herein, and such other embodiments or modifications are intended to be reserved especially as they fall within the scope and spirit of the sub-joined claims.

Figure 1A:
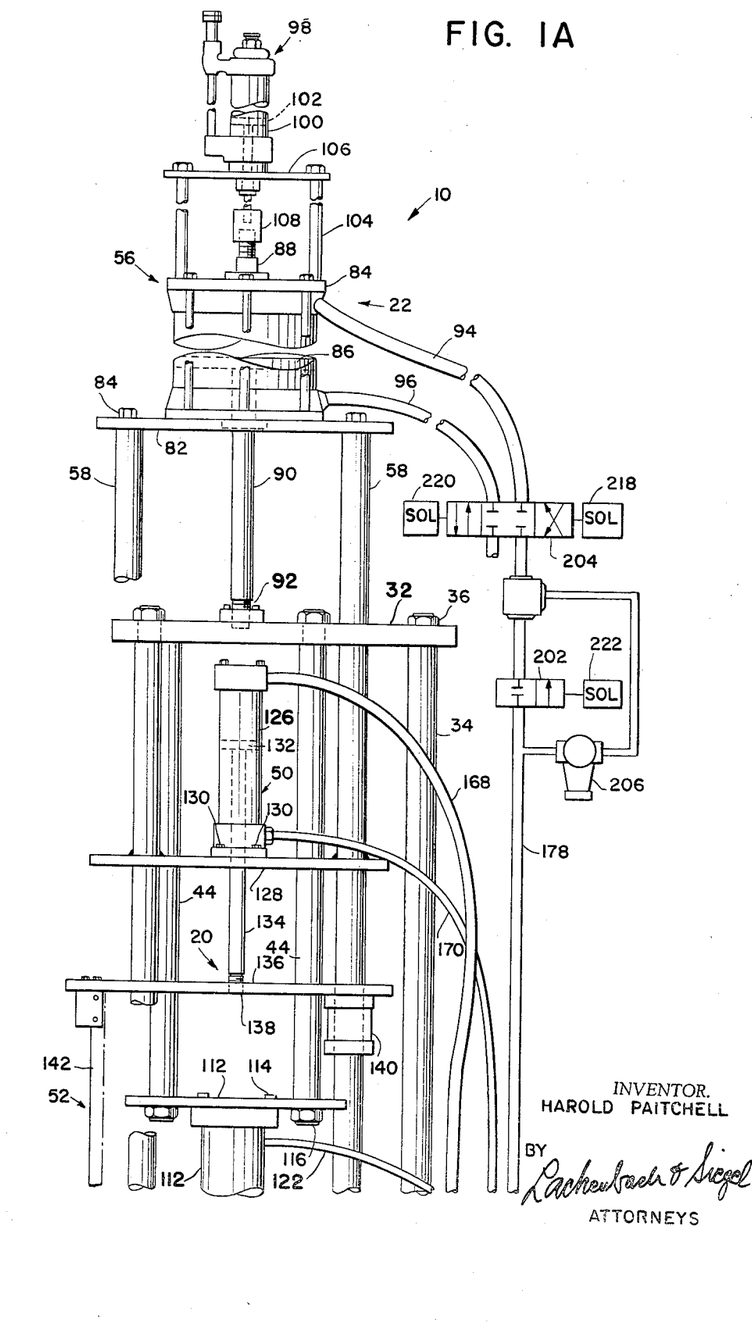
FIG. 1A is a schematic side elevational view showing the upper portion of apparatus constructed according to the present invention.
Figure 1B:
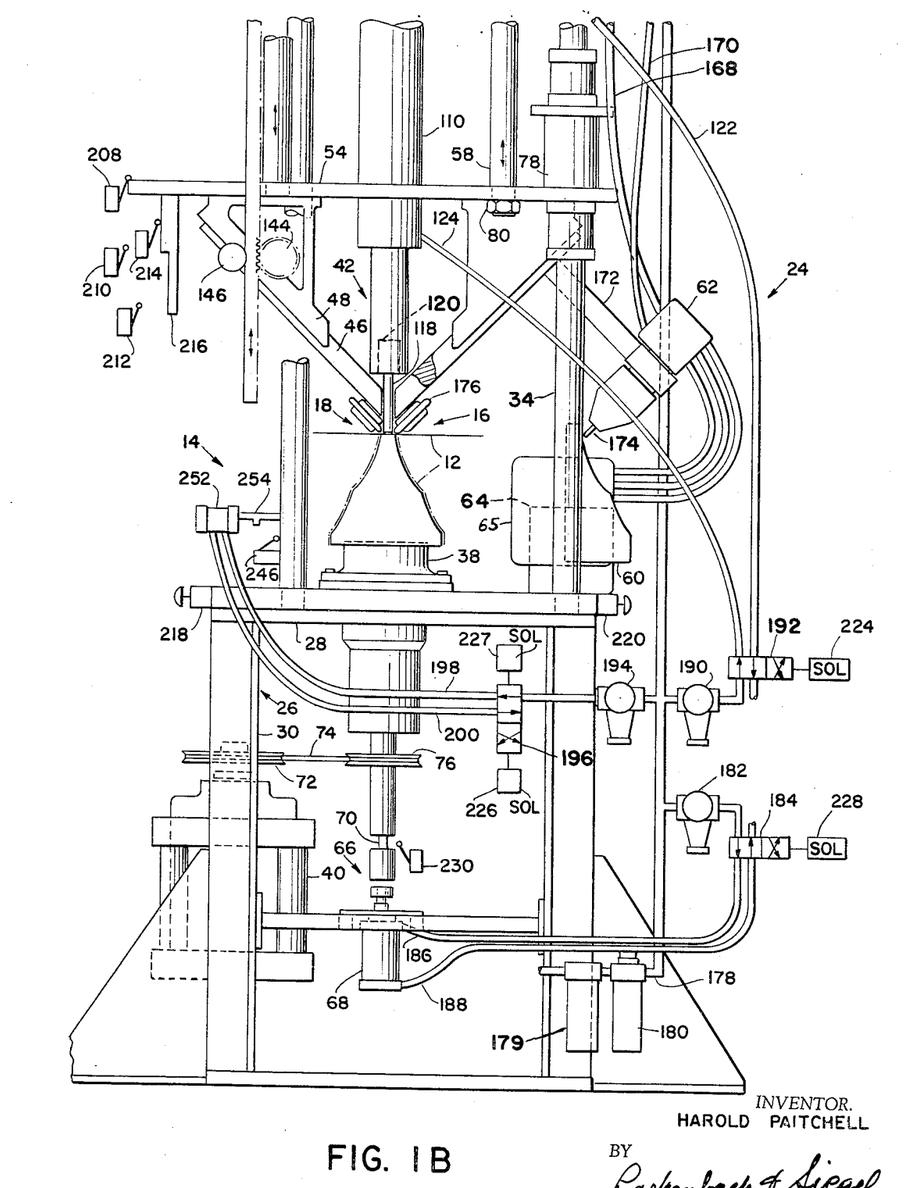
FIG. 1B is a schematic side elevational view similar to FIG. 1A showing the lower portion of the apparatus of FIG. 1A and is a continuation thereof.
Figures 2, 3:
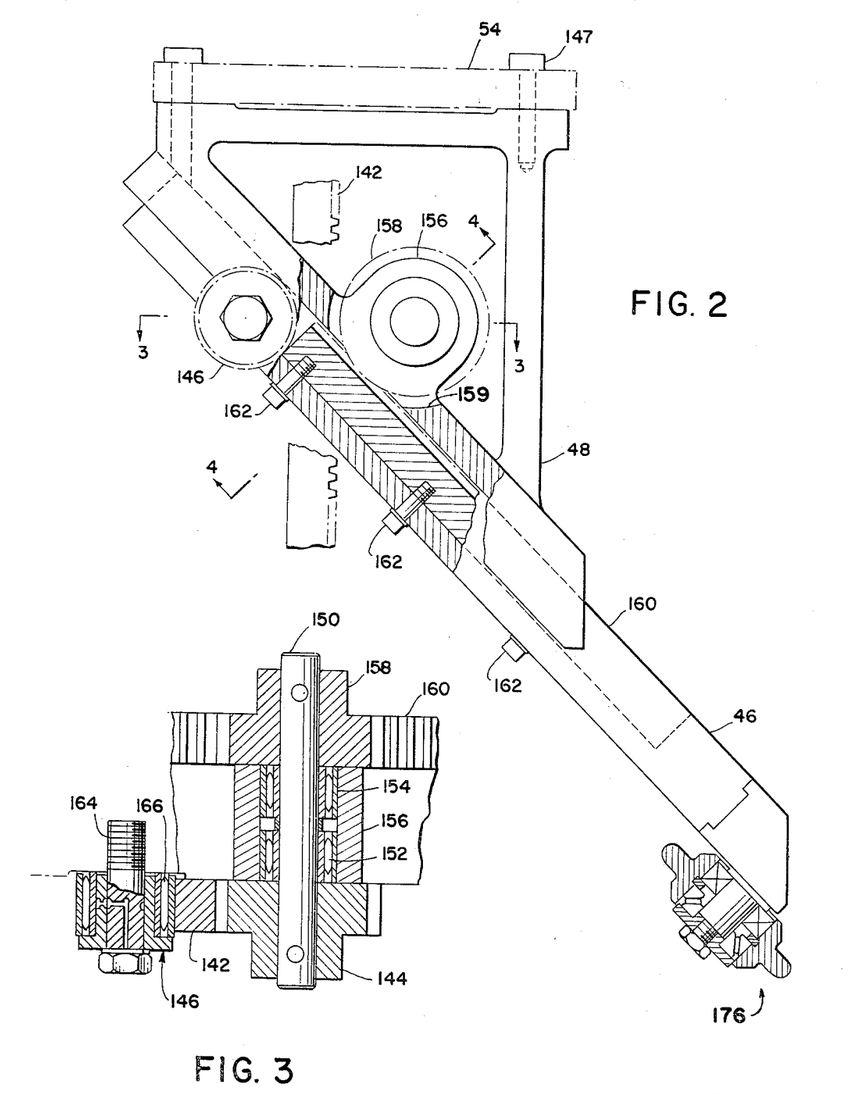
FIG. 2 is an enlarged schematic view of a portion of the apparatus of FIG. 1.
FIG. 3 is a partial cross sectional view taken along line 3—3 of FIG 2.
Figure 4:
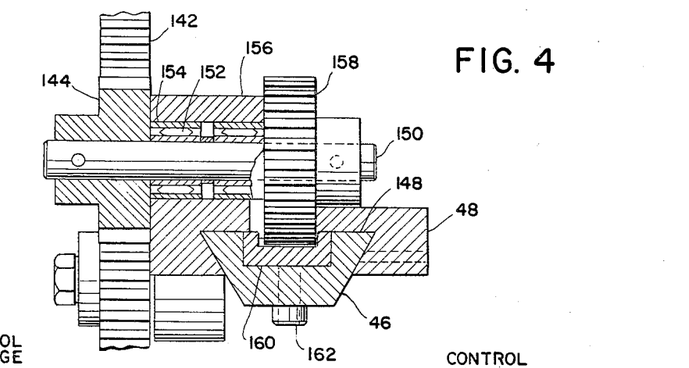
FIG. 4 is a partial cross sectional view taken along line 4—4 of FIG. 2.
Figures 5, 6, 7:
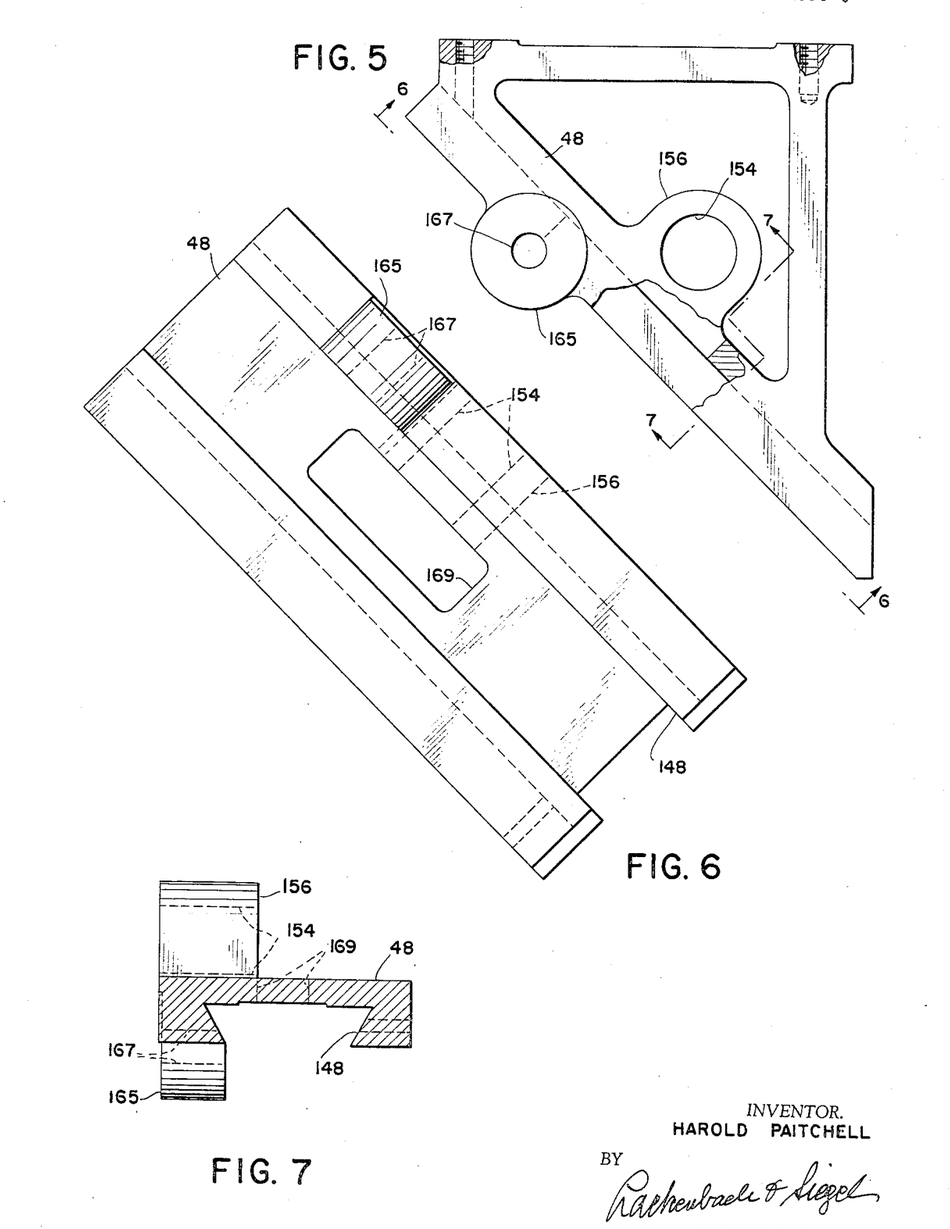
FIG. 5 is an elevational showing of the tool slide way 48 of the preceding figures.
FIG. 6 is a bottom plan view taken along line 6—6 of FIG. 5.
FIG. 7 is a sectional view taken along line 7—7 of FIG. 5.

Attention is now directed to the drawing, and especially to FIG. 1 thereof, wherein there is shown and illustrated an apparatus 10 for shaping a work piece 12 to a surface of revolution comprising frame means 14, work holding means 16 for rotatably supporting the work piece 12 relative to the frame 14, tool means 18 for shaping the work piece 12, actuating means 20 for moving the tool means 18 in a first direction relative to said work holding means, advancing means 22 for moving the tool means 18 in a second direction relative to the work holding means 16 and control means 24 for controlling the actuating means 20 and the advancing means 22.

The frame means 14 comprises a generally table-like support base 26 having a generally horizontal support plate 28 mounted on leg structures 30, a top stationary plate 32 generally parallel to and spaced from the support plate 28 and a plurality of stationary stand off tie rods 34 mounted between the top plate 32 and the support plate 28 and secured thereto as by threaded connections 36.

The work holding means 16 comprises a chuck 38 rotatably carried by the support plate 28 so as to be freely rotatable about a substantially vertical axis and positioned thereon substantially centrally of the standoff tie rods 34, motor means 40 mounted with the support base 26 for rotating the chuck 38, clamping means 42 for holding the work piece 12 in contact with the chuck 38 and a plurality of stationary tie rods 44 extending between the top plate 32 and the clamping means 42 to position the clamping means 42 relative to the frame means 14.

The actuating means 20 comprises a plurality of tool slides 46 slidably mounted with tool slide ways 48, motor means 50 and motion transfer means 52.

The advancing means 22 comprises a platen 54, motor means 56 and movable tie rod means 58.

The control means 24 comprises a template 60, a hydraulic tracer valve 62 and a tracer control mechanism 64.

Ejection means 66 comprising ejector motor means 68 and an ejector rod 70 is also preferably provided to assist in removing finished work pieces 12 from the chuck 38.

The motor means 40 preferably is of the variable speed type, such as a DC motor equipped for dynamic braking and carries on the output shaft thereof a pulley 72 connected as by a belt 74 with a pulley 76 carried by the chuck 38 below the support plate 28. The chuck 38 is configured to the desired surface of revolution and may be shaped automatically by the apparatus 10 as hereinafter more fully described.

The platen 54 is slidably mounted on the stand off tie rods 34 as by means of slider bearings 78 and the tool ways 48 are structurally associated with the platen 54 so as to be reciprocated therewith. The movable platen tie rods 58 are structurally operatively associated with the platen 54, as by screw connections 80 and extend generally upwardly thereof and within and between the stand off tie rods 34. A movable top plate 82 is secured with the upper end portions of the movable platen tie rods 58 as by screw connections 84. The motor means 56 which preferably comprises a double ended cushion cylinder 84 is structurally associated with the top plate 82 in any suitable manner. A double ended cushion cylinder is a cylinder having cross heads at each end portion thereof and so constructed and arranged as to provide a dead air space at each end of the piston travel to provide for cushioning of the piston travel at each end. A piston 86 having opposed piston rods 88 and 90 is slidably mounted within the cylinder 84. The lower piston rod 90 is structurally associated with the fixed top plate 32 as by threaded connection 92 so that upon admission of a fluid to the cylinder 84 on either side of the piston 86, the cylinder 84 will be reciprocated accordingly relative to the fixed top plate 32.

As hereinbefore pointed out, the advancing means 22 comprises the motor means 56 having the piston 86 thereof structurally associated with the frame means 14 through the lower piston rod 90 and the threaded connection 92, together with the cylinder 84, the movable platen 54 and the movable platen tie rods 58 structurally associating the cylinder 84 and the movable platen 54. Accordingly, if a fluid is admitted to the cylinder 84 at the upper end portion thereof as by means of fluid conduit 94, the cylinder 84 will be raised relative to the piston 86. Since the piston 86 is structurally associated with the frame 14, the cylinder 84 will be raised relative to the frame 14. The movable platen tie rods 58 will likewise be raised and will in turn raise the movable platen 54 which, as previously pointed out, is slidably associated with the stand off tie rods 34 by the bearings 78. Likewise, if a pressurized fluid is admitted to the cylinder 84 below the piston 86, as by conduit 96, the cylinder 84, the movable tie rods 58 and the movable platen 54 will be lowered. As is readily apparent, the weight of the movable portion of the advancing means 22 will tend to cause downward movement thereof and, accordingly, a relatively low pressure is all that is required in conduit 96 to lower the movable platen 54. Preferably, a compressible pressurized fluid, such as compressed air, is utilized to translate the cylinder 84 relative to the piston 86. As the travel speed of the cylinder 84 relative to the piston 86 will be dependent upon many factors other than the air pressure supplied, advancing speed control means 98 is provided. The advancing speed control means 98 preferably comprises a hydraulic cylinder 100 having a piston 102 slidably mounted therein. The hydraulic cylinder 100 is structurally associated with the cylinder 84 as by tie rods 104 secured with the cylinder 84 and with a plate 106 mounted with the hydraulic cylinder 100. The piston 102 is structurally associated with the upper piston rod 88 of the piston 86 as by threaded connection 108. Accordingly, the piston 102 will remain fixed relative to the frame 14 while the hydraulic cylinder 100 will move with the cylinder 84. The hydraulic cylinder 100 is filled with a hydraulic fluid which is permitted to flow around the piston 102 through a variable restrictor or metering valve, either local or remote to control the rate of travel of the hydraulic cylinder 100, air cylinder 84 and movable platen 54. As the work stroke of the movable platen 54 is preferably in the downward direction, the metering valve of the advancing speed control means or dashpot 98 is preferably so constructed and arranged as to permit free movement of the platen 54 upwardly while controlling the rate of travel thereof downwardly. Furthermore, the metering valve of the advancing speed control means or dashpot 98 may be remotely controlled, as by the position of the platen 54 to permit the rate of travel of the platen 54 to be varied during different portions of the stroke of the movable platen 54. For example, the metering valve means of the advancing speed control means or dashpot 98 may comprise a plurality of solenoid controlled restrictor valves controlled by electric switches mounted with the frame means 14 so as to be tripped or actuated by movement of the movable platen 54.

The clamping means 42 comprises a clamping cylinder 110 structurally associated with the tie rods 44 as by a plate 112 and threaded connections 114 and 116. The clamping cylinder 110 is accordingly suspended from the top plate 32 substantially centrally and above the chuck 38. The clamping means 42 further comprises a clamping element 118 rotatably associated with the piston of the clamping cylinder 110 as by a conventional bearing cartridge 120. The clamping cylinder 110 is preferably pneumatically actuated as through conduits 122 and 124 enabling the clamping element 118 to be extended to secure the work piece 12 against the rotating chuck 38.

The actuating means 20, as hereinbefore pointed out, comprises the actuating motor means 50, the motion transfer means 52 and the tool slides 46. The actuating motor means 50 comprises a hydraulic cylinder 126 structurally associated with the movable platen tie rods 58 as by means of a plate 128 secured with the hydraulic cylinder 126 as by threaded fasteners 130 and with the movable platen tie rods 58 as by brazing, or the like. The actuating motor means 50 further comprises a piston 132 slidable within the hydraulic cylinder 126 and a piston rod 134 connected with the piston 132 and extending outwardly of the hydraulic cylinder 126. A rack actuating plate 136 is structurally associated with the piston rod 134 as by a threaded connection 138 and is slidably associated with the movable platen tie rods 58 as by slide bearings 140. The motion transfer means 52 comprises a plurality of racks 142 structurally associated with the rack actuating plate 136 and depending therefrom engaged with pinion gears 144 carried by the movable platen 54. Backup wheels 146 retain the racks 142 in engagement with the pinion gears 144. The pinion gears 144 are preferably associated with the movable platen 54 by being pivotably mounted with the slides 48 which are preferably of generally triangular configuration. The tool slides 46 are driven from the pinion gears 144 in a manner hereinafter described.

Referring now more particularly to FIGS. 2–7 of the drawing, each of the tool slide ways 48 comprises a generally triangular casting secured with the movable platen 54 as by threaded fasteners 147. The lower portion of the slide guide way 48 is provided with a generally triangular groove 148 to slidably receive and retain the tool slides 46 which are likewise generally triangularly configured. The pinion gears 144 are structurally associated with shafts 150 rotatably supported by the ways 48 as by needle bearings 152 supported in bores 154 extending transversely through bosses 156 formed on the ways 48. A driven gear 158 is also structurally associated with each shaft 150, the teeth of the gears 158 extending into the grooves 148 to engage rack inserts 160 structurally associated with the tool slides 46 as by threaded fasteners 162. The backup wheels 146 are mounted with the slide ways 48 as by threaded shafts 164 eccentrically mounted within apertures 167 of the bosses 165 and comprise needle bearings 166. Apertures 169 are provided to enable the gears 158 to engage the rack portions 160, as shown. Accordingly, the shafts 150 and the associated gears 144 and 159 transfer motion of the racks 142 to the rack inserts 160 and to the slides 46, so that if the racks 142 move downwardly, then the slides 46 will be moved inwardly, and vice versa. It should be noted that the entire actuating means 20 is associated with the advancing means 22 and moves therewith.

As hereinbefore pointed out, the actuating motor means 50 is preferably hydraulically actuated. The hydraulic cylinder 126 is therefore connected with the hydraulic tracer valve 62 by conduit means 168 and 170. The tracer valve 62 is structurally associated with one of the slides 46 and moves therewith, as by a bracket 172. The tracer valve 62 is controlled by a stylus 174 and the template 60 is affixed to the frame 14 as by an adjustable template holder 65 so that pressure on the stylus 174 as it is moved along the template 60 by the advancing means 22 will cause actuation of the actuating motor means 50 and accordingly cause the slides 46 to move in reference to the template. During spinning of the work piece 12, the tool means 18 may comprise free running rollers 176 to form the work piece 12 to the configuration of the template 60.

It should be noted that the entire apparatus 10 is so constructed and arranged as to be exceedingly rigid, with the predominant stresses on the members thereof being either compression or tension, rather than bending with the cylinders 22, 110 and 126 being in substantial alignment and positioned axially of the chuck 38. The structure of the apparatus 10 preferably defines substantially concentric triangular portions for maximum stability and rigidity. Accordingly, there are preferably provided three standoff tie rods 54 defining an outer triangular portion, three movable tie rods 58 defining a second triangular portion, three stationary tie rods 44 defining a third triangular portion, and three tool slides 46. The configuration of the various portions of the apparatus 10 is therefore such as to require a minimum of floor space as is all readily apparent from the appended drawing.

Since the apparatus 10 is exceedingly rigid and stable, the chuck 38 may be cut to desired configuration with the apparatus 10. To cut the chuck 38 to the desired configuration, the forming rollers 176 are removed from the tool slides 46 and a cutting tool (not shown) affixed to one of the tool slides 46. The template 60 is then used to control the apparatus 10 to cut the chuck 38 to the desired configuration and, if necessary, the template 60 then modified to provide the desired forming pressures to the forming rollers 176 during spinning of the work piece 12. A cut-off tool may also be mounted with the frame means 14 to trim the edge of the work pieces 12 after spinning.

A single air line 178 provided with an air filter 179 and lubricator 180 provides pressurized air for operating the various pneumatic motors of the apparatus. Accordingly, a pressure reducer 182 is connected with the main air line 178 to provide pressurized air to a solenoid valve 184 connected with the ejector motor means 68 by conduits 186 and 188. A pressure reducer 190 is also connected with the main air line 178 to provide pressurized air to a solenoid valve 192 connected with the clamping cylinder 110 through the conduits 122 and 124. A pressure reducer 194 is connected with the main air line 178 to provide pressurized air to a solenoid valve 196 connected with the cutoff tool actuator 252 for the cutoff tool 254 through conduits 198 and 200. Since a lower pressure is required by the advancing cylinder 84 when lowering the platen 54 than is required by the advancing cylinder 84 when raising the platen 54, the conduit 94 which, as pointed out above, is utilized to raise the platen 54 is connectable directly with the main air line 178 through a pilot operated solenoid controlled valve 202 and a solenoid controlled four way valve 204. To provide a lower pressure for lowering the platen 54, the conduit 96 is connectable with the main air line 178 by the four way solenoid controlled valve 204 and a pressure reduction valve 206 connected parallel with the valve 202 so that when the valve 202 is closed, pressurized air is supplied to the four way valve 204 through the pressure reduction valve 206 and when the valve 202 is opened, the pressure reduction valve 206 is bypassed to provide direct high pressure air from the main air line 178 to the four way valve 204.

With continued reference to FIG. 1 of the drawing, a plurality of switches or micro-switches 208, 210 and 212 may be provided positioned for operation by the movement of the platen 54. The upper and lower switches 208 and 212, respectively, control the reversing of the movement of the platen at the upper and lower limits of the stroke thereof, while the limit switch 210 controls the ejector 66 as will be described in more detail hereinafter. Switch means such as a limit switch 214 is also structurally associated so as to be operable by a cam 216 movable with the platen 54 to control the rotational speed of the motor 40, or the motor speed may be controlled in response to the radial position of the tool means 18. A pair of start push buttons 218 and 220 may be provided at spaced locations relative to the apparatus 10 to function as a two-hand type of safety start device. The double solenoid four way valve 204 is provided with, as hereinbefore mentioned, a pair of solenoids such as a "lower" solenoid 218 and a "raise" solenoid 220. The pilot-operated single solenoid valve 202, the valve 192, the valve 196 and the valve 184 are each provided with operating solenoids 222, 224, 226 and 228 respectively. A limit switch or micro-switch 230 is provided positioned to be actuated by the movement of the ejector 66. The microswitches 208, 210, 212, 214 and 230 are each structurally associated with the frame of the apparatus 10 and are shown only schematically in FIG. 1 of the drawing, but may be structurally associated with the frame in any convenient manner. The valve 196 is also provided with a second solenoid 227 and the valve 196 is operatively connected with a cylinder 252 by means of the conduits 198 and 200 so that the solenoids 226 and 227 may control the movement of a cutting tool 254 towards and away from the chuck 38. A microswitch 246 is operatively structurally associated with the same or the apparatus 10 to be actuated at the end of the cutting stroke of the cutting tool 254.

Figure 8:
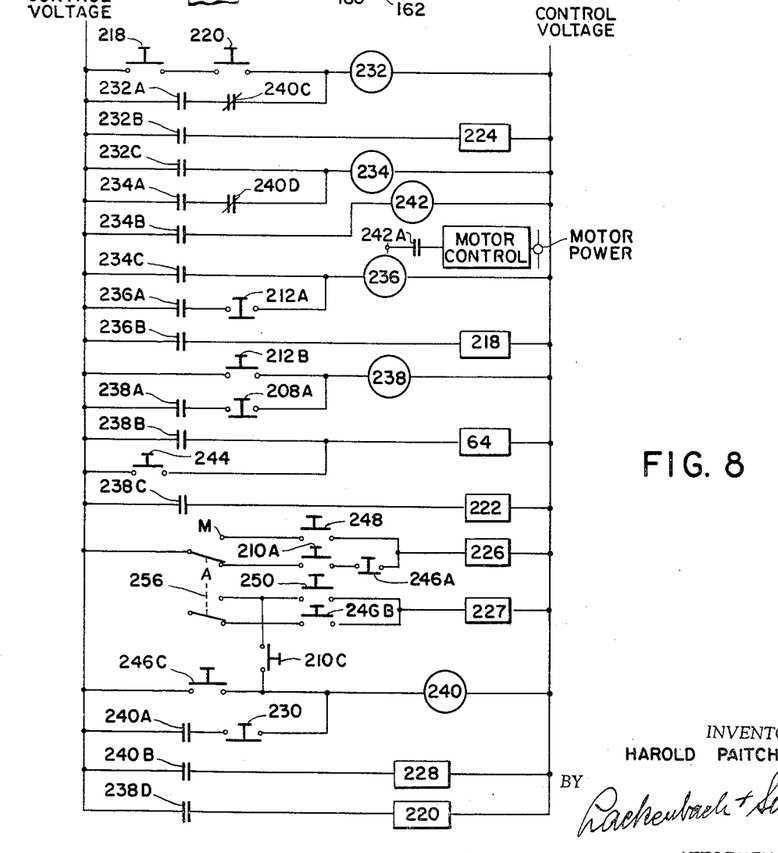
FIG. 8 is a schematic wiring diagram of the apparatus of the present invention.

With reference now to FIG. 8 of the drawing, a plurality of control relays 232, 234, 236, 238, 240 and 242 having contacts 232–A, 232–B, 232–C, etc., respectively, in conjunction with the various switches and control devices hereinbefore set forth enable the apparatus 10 to function completely automatically and to carry out a completely automatic cycle for shaping the work pieces 12. Accordingly, upon actuation of the start push buttons 218 and 220, the control relay 232 will be actuated and the normally open contact sets 232–A, 232–B, and 232–C thereof will be closed. Contact set 232–A functions as a holding leg for the coil of the control relay 232 maintaining the relay 232 actuated after the release of the start push buttons 218 and 220. It should be noted that the control relay 232 will not be actuated unless and until both of the manually operated push buttons 218 and 220 are actuated. Normally open relay contact set or pair 232–B is connected in series with the solenoid 224 which controls the clamping valve 196 to actuate the clamping air cylinder 110 thereby clamping the workpiece 12 against the chuck 38. Simultaneously, normally open contact set or pair 232–C is closed, actuating the control relay 234. Contact set 234–A is closed thereby forming a holding leg for the control relay 234 to maintain the relay 234 actuated even after the control relay 232 is de-enrgized. Normally open contact sets 234–B and 234–C are closed by the actuation of control relay 234 actuating the control relays 236 and 242. The control relay 242 controls the spindle rotation, as by means of normally open contact sets 242–A connected in series with the control of the motor 40 or, the motor 40 might be of the constantly rotating variety with the normally open contact set 242–A controlling an electric clutch operatively associated between the motor 40 and the chuck 38. The relay 236 controls the downward movement of the platen 54 through the solenoid 218. The normally open contact set 236–A of the control relay 236 is utilized to provide a holding leg therefor and the normally open contact set 236–B is connected in series with the "lower" solenoid 218 controlling the double solenoid four-way valve 204. Accordingly, when control relay 236 is actuated, the contact set 236–B thereof closes providing energization of the "lower" solenoid 218 of the double solenoid four-way valve 204 providing reduced air pressure from the main line 178 through the pressure reducer 206 to the conduit 96 connected with the bottom end of the double-ended cylinder 22. The main line pressure of the conduit 178 is precluded from entering the conduit 96 by the pilot-operated valve 202 which remains closed since the solenoid 222 thereof is not energized. As pointed out above, only a relatively low pressure is necessary to lower the platen 54 because the weight thereof provides a biasing tending to lower the platen 54. When the platen 54 reaches the lower end of its stroke, the micro-switch 212 is actuated thereby, either directly by the platen 54, as shown, or indirectly by means of any element responsive to the movement of the platen 54. Upon the actuation of the micro-switch 212, the normally closed contact set 212–A thereof which is connected in series with the holding leg of the control relay 236 is opened releasing the control relay 236 which in turn causes the double solenoid four-way valve 204 to close to preclude further downward movement of the platen 54.

As hereinbefore pointed out, the rate of downward travel of the platen 54 is controlled by means of the advancing speed control means 98 which includes the metering valve which may be either manually set to provide a single controlled rate of travel for platen 54, or may include electrically responsive metering valve means such as a plurality of solenoid actuated metering valves, to enable the rate of platen 54 to be varied during the stroke thereof. Such variation could be accomplished by means of the micro-switch 214 and the cam 216 in a similar manner to the speed of the motor 40. Either separate microswitches may be provided for controlling the spindle speed and the travel speed, or a single set of micro-switches might be utilized to control both the spindle speed and the travel speed. The cam 216 would be contoured to relate the travel speed and the spindle speed to the dimensional changes being performed on the workpiece 12.

When the platen 54 reaches the lowermost point of travel thereof, as mentioned above, the micro-switch 212 is operated. The normally open contact set 212–B of the micro-switch 212 actuates the control relay 238 to control the raising or return stroke of the platen 54. Accordingly, contact set 238–A is operatively associated to form a holding leg for the control relay 238, the holding leg also comprising the normally closed micro-switch 208 structurally associated with the apparatus 10 to be actuated only when the platen 54 is in the uppermost position thereof. Accordingly, with the platen 54 at any position other than the uppermost position thereof, the normally closed micro-switch 208 will be closed enabling the contact set 238 to hold the control relay 238 actuated. The contact set 238–B of the control relay 238 is connected with the stylus control mechanism 64 to cause retraction of the stylus 64 away from the template 60 during upward movement of the platen 54. The normally open contact set 238–C of the control relay 238 is connected with the solenoid 222 of the pilot-operated single solenoid valve 202 so that upon actuation of the control relay 238 the valve 202 will be opened directly connecting the main line pressure from the conduit 178 with the double solenoid four-way valve 204. Simultaneously, normally open contact set 238–D will be closed to energize the "raise" solenoid 220 of the double four-way solenoid valve 204. Accordingly, when the control relay 238 is actuated, the stylus 174 will be retracted from the template 60, main line pressure from the control conduit 178 will be directed to the double solenoid four-way valve 204 and the double solenoid valve 204 will admit the main line pressure from the conduit 178 to the conduit 94 and to the upper end of the double-ended cylinder 84 to raise the platen 54. When the platen 54 reaches the uppermost position thereof, then the normally closed micro-switch 208 will be opened, interrupting the holding leg to the control relay 238 and thereby precluding further movement of the platen 54 in an upward direction. A normally open push-button switch 244 may be provided in parallel with the contact set 238–B as shown, to provide for manual retraction of the stylus 174 when desired.

The micro-switch 210 is likewise actuated in response to the platen movement and is so configured and arranged as to be actuated only during the upward movement of the platen 54. The micro-switch 210 is so arranged as to be operated during the upward stroke of the platen 54 and may be located, for example, physically centrally of the uppermost and lowermost positions of the platen 54. Upon actuation of the micro-switch 210, the normally open contact set 210–A thereof is closed providing energization of the advance solenoid 226 of the cutoff control valve 197 to admit pressurized air to the pneumatic cylinder 252 to advance the cutting tool 254 towards the chuck 38 to trim the workpiece 12. As the cutting tool 254 reaches the end of its cutting stroke, the micro-switch 246 is actuated and the normally closed contact set 246–A thereof is opened to preclude further inward movement of the cutting tool 254 while the normally open contact set 246–B thereof is closed to actuate the cutoff retraction solenoid 227 to retract the cutting tool 254. Also, normally open contact set 246–C is closed to actuate the control relay 240. A switch 256 is provided to enable the cutoff operation to be eliminated from the automatic cycle, in which case the switch contact 210–C would directly energize the control relay 240. Also, normally open push-button switches 248 and 250 may be provided to enable manual operation of the cutoff tool 254.

Upon completion of the forming cycle, that is, the actuation of the control relay 240, the contact set 240–A thereof will be closed to provide a holding leg for the control relay 240. Upon actuation of the control relay 240, contact set or pair 240–B will also be closed, energizing the ejector solenoid 228 to raise the ejector 70 and free the workpiece 12 from the chuck 38. Also, normally closed contact set 240–C will open to release the holding leg of control relay 232 to in turn open the contact set 232–B to retract the clamping air cylinder 110. The normally closed contact set 240–D will likewise be opened, enabling the release of control relays 234 and 242 stopping the motor 40 or otherwise, as above mentioned, stopping the rotation of the chuck 38. Upon completion of the ejector stroke, the normally closed micro-switch 230 will be actuated to break the holding leg to the control relay 240 thereby releasing the ejector 228 and readying the apparatus for a new cycle.

Certain nomenclatures and terminologies, such as "raise" and "lower" have been used throughout the description of the present invention solely for the purpose of aiding in an understanding thereof, and such nomenclatures and terminologies are not intended to be limiting, but rather, to be construed in their general and broadest sense, especially if and when utilized in the ensuing claims.

While this invention has been shown, described, illustrated and disclosed in terms of certain preferred embodiments or modifications thereof which as assumed in practice, certain other embodiments or modifications may be apparent to those having the benefit of the teachings herein, and such other embodiments or modifications are intended to be specifically reserved, especially if they fall within the scope and breadth of the subjoined claims.

I claim:

1. Material shaping apparatus for shaping work-pieces to a surface of revolution comprising, in combination, a frame, means for shaping a zone of a work-piece to a surface of revolution, and means for moving said shaping means relative to such work-piece, said shaping means and said moving means being disposed in generally axial alignment generally along the rotational axis of the surface of revolution and wherein said moving means comprises a plurality of motors for providing, respectively, controlled movement of said shaping means in a first and a second direction relative to the axis of such surface of revolution and disposed one behind the other and in generally axial alignment with each other generally along the rotational axis of the surface of revolution.

2. Material shaping apparatus as defined in claim 1 wherein said shaping means comprises, in turn, work holding means for rotatably supporting such work-piece relative to said frame and tool means for operating on such work-piece to shape it to such surface of revolution.

3. Material shaping apparatus as defined in claim 2 wherein said moving means further comprises actuating means connected between one of said plurality of motors and said tool means for moving said tool means in such first direction relative to said work holding means and advancing means connected between another of said plurality of motors and said tool means for moving said tool means in a second direction relative to said work holding means.

4. Material shaping apparatus for shaping work-pieces to a surface of revolution comprising, in combination, a frame, means for shaping a zone of such work-pieces to a surface of revolution and comprising, in turn, work holding means for rotatably supporting such work-pieces relative to said frame and tool means for operating on such work-pieces to provide such surface of revolution, and means for moving said shaping means relative to said work-pieces and comprising, in turn, a plurality of motors disposed one behind the other and in generally axial alignment with each other generally along the rotational axis of the surface of revoltuion, actuating means connected with one of said plurality of motors for moving said tool means in a first direction relative to said work holding means and advancing means connected with another of said plurality of motors for moving said tool means in a second direction relative to said work holding means.

5. Material shaping apparatus as defined in claim 4 wherein said actuating means is carried by said advancing means.

6. Material shaping apparatus as defined in claim 4 further comprising control means for controlling the movement of said tool means along a path defining such surface of revolution.

7. Material shaping apparatus as defined in claim 4 wherein said frame comprises a support base, a stationary plate spaced from said support base, and a plurality of stand-off tie rods extending between said stationary plate and said support base.

8. Material shaping apparatus as defined in claim 7 wherein said work holding means comprises a chuck rotatably carried by said support base extending toward said stationary plate generally centrally of said stand-off tie rods and motor means for rotating said chuck.

9. Material shaping apparatus as defined in claim 8 wherein said motor means comprises a variable speed motor.

10. Material shaping apparatus as defined in claim 8 further comprising clamping means for holding such work-piece against said chuck, said chuck being configured to said surface of revolution.

11. Material shaping apparatus as defined in claim 10 wherein said clamping means comprises an expansible chamber device having a fixed portion and a movable portion, stationary tie rod means extending between said fixed portion and said stationary plate generally centrally of said stand-off tie rods and a clamping element structurally associated with said movable portion and rotatable relative to said fixed portion.

12. Material shaping apparatus as defined in claim 11 wherein said fixed portion comprises a cylinder generally axially aligned with said chuck, said movable portion comprises a piston telescopingly engaged with said cylinder and said clamping elements is rotatably axially associated with said piston.

13. Material shaping apparatus as defined in claim 8 further comprising ejecting means for separating shaped work-pieces from said chuck, said ejecting means comprising an ejector rod slidably extending through said chuck generally centrally thereof and motor means for slidably moving said ejector rod axially of said chuck.

14. Material shaping apparatus as defined in claim 13 wherein said ejecting motor means comprises an expansible chamber device having a cylinder structurally associated with said support base and a piston telescopingly engaged with said cylinder and extendible outwardly therefrom for moving said ejector rod.

15. Material shaping apparatus as defined in claim 7 wherein said advancing means comprises a platen slidably mounted on said stand-off tie rods, said advancing motor means for moving said platen being structurally associated with said stationary plate and movable tie rod means extending between said platen and said advancing motor means generally centrally of said stand-off tie rod means.

16. Material shaping apparatus as defined in claim 15 wherein said advancing motor means comprises a piston structurally associated with said stationary plate and a cylinder structurally associated with said movable tie rod means.

17. Material shaping apparatus as defined in claim 16 wherein said advancing means further comprises motion dampening means for limiting the motion of said motor means, said motion dampening means comprising a piston structurally associated with said piston of said advancing motor means, a cylinder structurally associated with said cylinder of said advancing motor means and restrictor means for limiting fluid flow past said motion dampening piston, said dampening means being axially aligned with said advancing motor means.

18. Material shaping apparatus as defined in claim 17 wherein said advancing motor piston comprises a double-ended piston, one end of said double-ended piston being structurally associated and axially aligned with said motion dampening piston.

19. Material shaping apparatus as defined in claim 17 wherein said restrictor means comprises remotely operable metering valve means.

20. Material shaping apparatus as defined in claim 15 further comprising a plurality of tool slide ways structurally associated with said platen, said tool slide ways being positioned generally angularly of said platen and said stand-off tie rod means.

21. Material shaping apparatus as defined in claim 20 wherein said actuating means comprises a plurality of tool slides slidably mounted with said tool slide ways, said actuating motor means being positioned generally axially of said advancing motor means.

22. Material shaping apparatus as defined in claim 21 wherein said actuating motor means comprises a cylinder structurally associated with said movable tie rods, a piston slidably extendibly associated with said cylinder, and motion transfer means for moving said tool slides in response to movement of said actuating piston.

23. Material shaping apparatus as defined in claim 22 wherein said motion transfer means comprises a rack actuating plate slidably associated with said movable tie rods, said rack actuating plate being structurally associated with said actuating piston, a plurality of racks extending from said rack actuating plate generally parallel to said movable tie rods, rack portion structurally associated with each of said tool slides and gearing means rotatably carried by said platen, said gearing means being in constant meshing engagement with said rack and said rack portions.

24. Material shaping apparatus as defined in claim 23 further comprising adjustable back-up means for retaining said racks and said rack portions engaged with said gearing.

25. Material shaping apparatus as defined in claim 21 wherein said tool means comprises forming rollers removably rotatably mounted in a fixed longitudinal position on said slides.

26. Material shaping apparatus as defined in claim 21 wherein said tool means comprises cutting means removably mounted on said slides for shaping said chuck.

27. Material shaping apparatus as defined in claim 6 wherein said control means comprises pre-set control means for controlling movement of said actuating motor means.

28. Material shaping apparatus as defined in claim 27 wherein said pre-set control means comprises a template structurally associated with said frame and said actuating motor means comprises tracer means for following said template.

29. Material shaping apparatus as defined in claim 28 wherein said tracer means comprises a tracer element movable relative to said template and tracer control means for controlling said actuating means to maintain said tracer element in a pre-set orientation relative to said template during movement of said tracer element along said template.

30. Material shaping apparatus as defined in claim 29 wherein said tracer control means comprises hydraulic valve means.

31. Material shaping apparatus as defined in claim 15 further comprising advancing speed control means responsive to the position of said platen for controlling said advancing motor means.

32. Material shaping apparatus as defined in claim 15 further comprising chuck speed control means for controlling the rotational velocity of said chuck, said chuck speed control means being responsive to the position of said platen.

33. Material shaping apparatus as defined in claim 22 wherein said adjustable back-up means comprises back-up wheels rotatably mounted on eccentrically mounted rotatably positionable shafts.

34. Material shaping apparatus as defined in claim 15 further comprising limit switches responsive to the movement of said platen for controlling the sequential operation of said apparatus.

35. Method of shaping work-pieces to surfaces of revolution comprising, at least the steps of, rotating a workpiece relative to forming tool means slidably carried by a platen, translating said platen along a path generally parallel to the rotational axis of said work-piece, translating an actuating plate relative to said platen along a path generally parallel to the rotational axis of said work-piece, transferring the motion of said plate to said tool means to move said tool means relative to said platen generally laterally of the rotational axis of said work-piece, and transmitting the stresses developed in said tool means, said platen and said actuating plate generally parallel to the rotational axis of said workpiece.

36. Method of shaping work-pieces as defined in claim 35 comprising, at least the additional steps of, clamping the work-piece adjacent a rotatable chuck configured to the desired surface of revolution and transmitting the stresses developed by said clamping in a direction generally parallel to the rotational axis of said work-piece.

37. Method of shaping work-pieces as defined in claim 35 wherein said step of transferring comprises, at least the steps of, translating a rack structurally associated with said actuating plate relative to said platen along a path generally parallel to the rotational axis of said work-piece, rotating gear means structurally rotatably associated with said platen and engaged with said rack in response to movement of said rack and translating another rack structurally associated with said tool means and slidably associated with said platen to engagement thereof with said gear means.

References Cited

UNITED STATES PATENTS

| 1,836,921 | 12/1931 | Harrison | 72—83 |
| 2,349,606 | 5/1944 | Berg et al. | 72—85 |
| 2,975,743 | 3/1961 | Hoffmann et al. | 72—85 |
| 3,137,259 | 6/1964 | Sporck | 72—83 |

FOREIGN PATENTS

| 745,053 | 2/1956 | Great Britain. |

RICHARD J. HERBST, Primary Examiner

U.S. Cl. X.R.

72—83